United States Patent [19]
Kaiser

[11] Patent Number: 5,215,562
[45] Date of Patent: Jun. 1, 1993

[54] SELF-CLEANING FILTER APPARATUS

[76] Inventor: David M. Kaiser, 1403 Woodland Dr., Santa Paula, Calif. 93060

[21] Appl. No.: 911,279

[22] Filed: Jul. 9, 1992

[51] Int. Cl.$^5$ .............................................. B01D 46/04
[52] U.S. Cl. ........................................ 55/294; 55/500; 55/521
[58] Field of Search ................ 55/284, 294, 497, 500, 55/521

[56] References Cited

U.S. PATENT DOCUMENTS

| | | | |
|---|---|---|---|
| 3,303,635 | 2/1967 | Sherrill | 55/294 X |
| 3,555,785 | 1/1971 | Wooldridge et al. | 55/294 X |
| 4,203,738 | 5/1980 | Kerman | 55/294 X |
| 4,904,282 | 2/1990 | Stuble et al. | 55/294 X |

Primary Examiner—Charles Hart
Attorney, Agent, or Firm—Gene W. Arant

[57] ABSTRACT

An air flow system for removing airborne particulate material includes a bank of filters through which air is moved in one direction, thus depositing particulate material on an air input side of the filters. A vacuum head associated with a secondary vacuum system is intermittently applied in a reciprocating movement to selected portions of the air input side of the filters for cleaning them, while the remaining portions of the filters continue to operate in the normal manner without interruption. Both the filters and the vacuum head are provided with integrally formed interengaging guide means which facilitate this operation.

9 Claims, 1 Drawing Sheet

SELF-CLEANING FILTER APPARATUS

RELATED PATENT

The invention disclosed and claimed herein is an improvement over the METHOD AND APPARATUS FOR REMOVING CONTAMINATED AIR FROM AN ENCLOSED DIRTY AIR SPACE which is disclosed and claimed in my copending application Ser. No. 07/659,280 filed Feb. 22, 1991, now U.S. Pat. No. 5,129,922 issued Jul. 14, 1992. The entire disclosure of that patent is incorporated herein by reference.

According to that patent, in which the method is illustrated as being utilized in the processing of lemons, contaminated air is drawn from a relatively enclosed dirty air space and filtered to remove both contaminants and other particulate materials, including many mold spores. A set of main mechanical filters is positioned between the dirty air space and a surrounding environment which needs to be protected from contamination. An exhaust fan is positioned on the output side of the main filters, creating a vacuum within the dirty air space in order to cause contaminants to be deposited onto the air input side of the main filters as the air is drawn from the dirty air space into the surrounding environment.

Also in accordance with that patent a secondary vacuum system is utilized to create a secondary vacuum substantially stronger than the partial vacuum applied to the main filters. Cleaning heads associated with the secondary vacuum system are intermittently applied to selected portions of the air input side of the main filters. Detection means is provided to detect when resistance to air flow through the main filters has increased above a predetermined level, and for automatically activating the secondary vacuum system. The vacuum from the vacuumized cleaning heads then overpowers the principal vacuum, causing the cleaning heads to create a reverse air flow to remove the accumulated material that is clinging to the dirty surface of the main filters, but without interrupting the operation of the main filters or the flow of cleaned and filtered air.

According to that patent a plurality of main mechanical filters 24 are attached to a horizontal separator wall 29 and separate a dirty air space 36 from a clean air space 37. The filters are arranged in horizontal banks or rows with their air entry side down, so that their lower and air input side is adjacent the dirty air space while cleaned air escapes on their upper side. These main mechanical filters 24 are of the HEPA or absolute type and are driven by an exhaust fan positioned on their upper or air output side, which creates a primary vacuum source and hence draws the air through the main filters 24 in order to clean the air. Particulate material then collects on their air input or underneath side.

The type of filter preferred in accordance with the patent is a HEPA—high efficiency particulate air—filter which utilizes a polypropylene media folded in the usual serpentine configuration over corrugated separators made of aluminum or a non-reactive material. See the patent, FIG. 4.

A vacuum cleaning head is positioned on the under or dirty side of each row of main filters. A pair of horizontal tracks are provided beneath the bank of HEPA filters for supporting each vacuum cleaning head. A motor, not specifically shown, drives the cleaning head in a horizontal reciprocating movement.

PRIOR ART

Relevant prior art includes U.S. Pat. No. 4,507,130 issued to Roth on Mar. 26, 1985, and U.S. Pat. No. 4,904,282 issued to Stuble et al on Feb. 27, 1990.

SUMMARY OF THE INVENTION

According to the present invention a bank of HEPA filters, and a vacuum head adapted for reciprocating motion for cleaning their under sides, are provided with integrally formed interengaging guide means. This construction greatly facilitates the operation of a secondary vacuum system as described in my above-referenced patent, as well as reducing the cost of manufacture.

In the preferred form of the invention the HEPA filters are provided with tracks on their under sides. Each vacuum head is then provided on its longitudinal side edges with outwardly protruding flanges which are adapted to interengage and ride within the tracks of the HEPA filters. Preferably the tracks are integrally formed with the filter frames.

DRAWING SUMMARY

FIG. 1 is a perspective view of the presently preferred form of the novel apparatus of the present invention; and FIG. 2 is a side elevation view of the apparatus.

DETAILED DESCRIPTION

Figure 1:
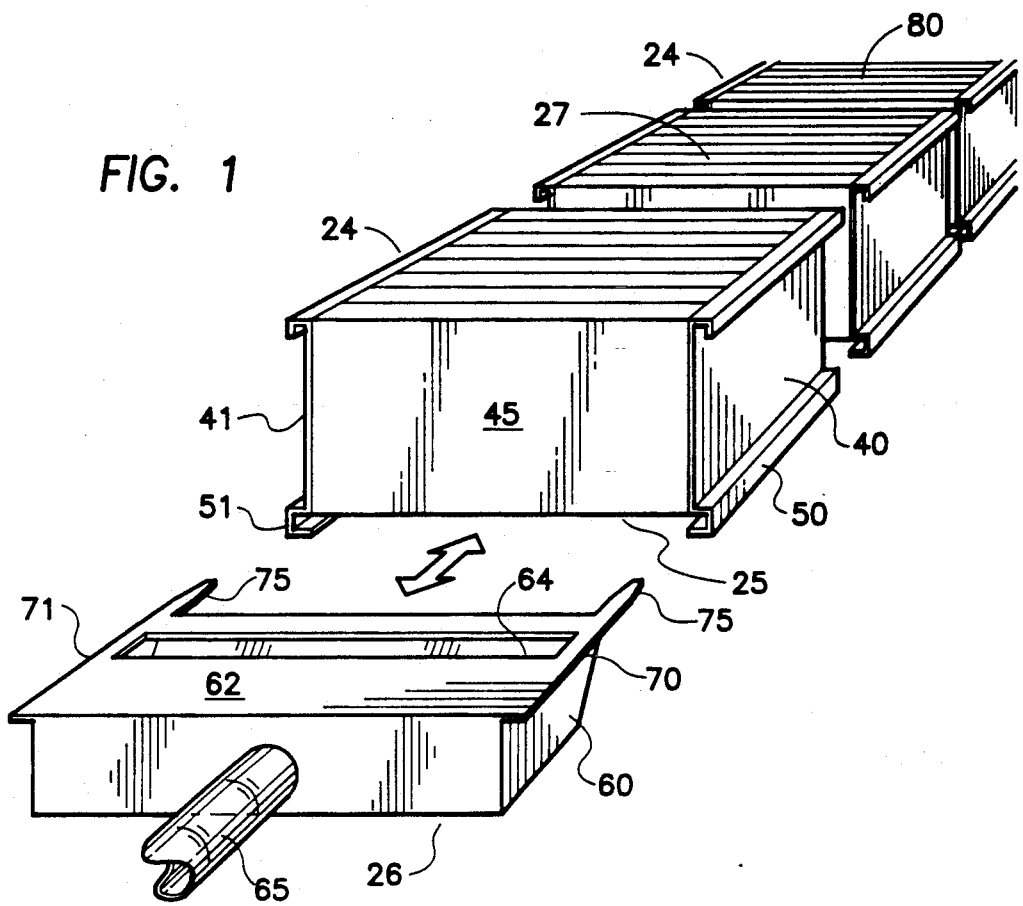
Figure 2:
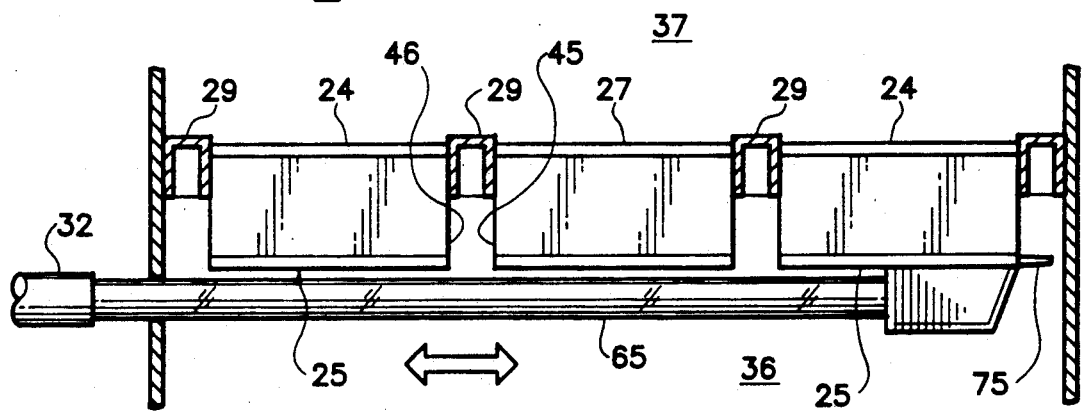

As shown in the drawings a main filter circuit includes a bank of HEPA filters 24 which receive air on their air input side 25 from a dirty air space 36 and deliver it through air output side 27 into a clear air space 37. A housing and an exhaust fan, not specifically shown, but which may be as disclosed in my above-referenced patent, control the air flow so as to pull air from the dirty air space 36 through the HEPA filters 24. Particulate material then collects on the air input or underneath side 25 of filters 24.

A secondary filter circuit includes at its input end a vacuum cleaning head 26 which is positioned on the under or dirty side of the filters 24 for intermittently cleaning them. Vacuum head 26 is coupled through a flexible hose 32 to the interior of a secondary air cleaning module, not specifically shown. The cleaning head 26 never obstructs a significant portion of the entire bank of filters, hence the greatest portion of the filters continues to operate normally at all times.

More specifically, each HEPA filter 24 has a parallel pair of metal side walls 40, 41, a parallel pair of imperforate end walls 45, 46, extending transversely between the side walls at respective ends thereof, and a filter medium 80 that is coextensive with the area between the side walls and end walls and is arranged in a conventional serpentine configuration in a plane parallel to the side walls. One side 25 of the filter medium is an air input side and the other side 27 is an air output side. The longitudinal edges of the side walls adjacent the input side 25 of the filter medium having elongated guide means 50, 51, thereon.

The vacuum head 26 has a housing 60 whose width is approximately equal to the distance between the side walls 40, 41, of each filter. The vacuum head 26 also has a flat top plate 62 which covers the housing 60 and has longitudinally extending guide means 70, 71, at its respective side edges which are adapted to interengage the elongated guide means 50, 51, of each filter. The top plate 62 also has a suction opening 64 therein which extends transversely between the guide means 70, 71, of the vacuum head.

When the guide means 70, 71, of the vacuum head are interengaged with the guide means 50, 51, of a filter a rigid pipe 65 on the rearward end of housing 60 is effective for moving the vacuum head in a reciprocating sliding movement relative to the filter. Preferably the reciprocating movement of the pipe 65 is accomplished manually. Thus, air may normally flow through the filters from air input sides 25 to air output sides 27, but at the same time a selected portion of the air input side of one of the filters may be cleaned by a secondary vacuum applied through suction opening 64 of vacuum head 26. With a manual cleaning operation the cost may be kept to a minimum.

According to the presently preferred form of the invention the guide means 50, 51, on the filters 24 are in the form of tracks integrally formed with the side walls 40, 41 of each of the filters. The separate guide means 70, 71, on the vacuum head 26 are in the form of flanges integrally formed as part of the top plate 62. It is also preferred to form a projection 75 on the forward end of each of the flanges 70, 71, in order to provide positive alignment of the vacuum head with each filter 24 of the filter bank. The projections 75 are preferably formed with a slight inward taper.

Forming the guide means integrally with side walls 40, 41, of the filters 24 and with the top plate 62 of the vacuum head 26 reduces manufacturing cost. More importantly, it provides a more sturdy, reliable structure, and thereby ensures an effective and precisely correct cleaning operation which avoids damage to the filter.

It will be apparent to those skilled in the art that various other configurations of interengaging guide means may be used, which will perform the same general function in the same general way as those illustrated. For example, the bottoms of the side walls 40, 41, of each filter may have an outwardly extending flange formed thereon, while the edges of top plate 62 may be formed with inwardly turned tracks. Other configurations are also possible.

A presently preferred embodiment of the invention has been described in detail in order to comply with the patent law. The scope of the invention, however, is to be measured only in accordance with the appended claims.

What I claim is:

1. Self-cleaning filter apparatus comprising:
    a HEPA filter having air input and air output sides;
    a vacuum head for selectively applying a secondary vacuum to a portion of said air input side;
    interengageable guide means integrally formed on both said filter and said vacuum head for guiding said vacuum head into engagement with said air input side of said filter and in a sliding movement relative thereto so as to successively engage different portions of said air input side of said filter; and
    said interengageable guide means including tracks integrally formed on said filter and flanges integrally formed on said vacuum head.

2. The apparatus of claim 1 wherein a projection is formed on the forward end of each of the flanges of said vacuum head, said projections being formed with a slight inward taper in order to provide positive alignment of said vacuum head with said tracks of said filter.

3. Self-cleaning filter apparatus comprising:
    a plurality of HEPA filters each having air input and air output sides;
    support means supporting said filters in an aligned relationship;
    a vacuum head for selectively applying a secondary vacuum to the air input side of said filters; and
    a set of guide means formed on said filters in an aligned relationship, including tracks integrally formed on each of said filters; and
    said vacuum head having separate guide means which is interengageable with said aligned guide means of said filters for guiding said vacuum head in a sliding movement into engagement with said air input side of successive ones of said filters so as to successively engage different portions of said air input sides of said filters; said separate guide means on said vacuum head including flanges integrally formed on said vacuum head.

4. The apparatus of claim 3 which further includes an elongated rigid handle on the rearward end of said vacuum head housing for moving said vacuum head relative to said filters.

5. The apparatus of claim 3 which further includes a projection formed on the forward end of each of said flanges of said vacuum head, said projections being formed with a slight inward taper in order to provide positive alignment of said vacuum head with said tracks of said filters.

6. Self-cleaning filter apparatus comprising:
    a HEPA filter having a parallel pair of metal side walls, a parallel pair of imperforate end walls extending transversely between said side walls at respective ends thereof, and a filter medium that is coextensive with the area between said side walls and end walls and having a serpentine configuration in a plane parallel to said side walls;
    one side of said filter medium being an air input side and the other being an air output side, and the longitudinal edges of said side walls adjacent said input side of said filter medium having tracks integrally formed therewith providing elongated guide means thereon;
    a vacuum head having a housing whose width is approximately equal to the distance between said side walls of said filter, and having a flat top plate which covers said housing and having flanges integrally formed thereon which provide longitudinally extending guide means at its respective side edges which are adapted to interengage said elongated guide means of said filter, said top plate also having a suction opening therein which extends transversely between said guide means of said vacuum head; and
    means operable when said guide means of said vacuum head are interengaged with said guide means of said filter for moving said vacuum head in a reciprocating sliding movement relative to said filter, whereby air may normally flow through said filter from said air input side to said air output side but at the same time selected portions of said air input side may be cleaned by a secondary vacuum applied through said suction opening of said vacuum head.

7. The apparatus of claim 6 which includes a plurality of HEPA filters each having air input and air output sides;
    support means supporting said filters in an aligned relationship; and corresponding sets of guide means formed on said filters in an aligned relationship.

8. The apparatus of claim 6 wherein said means for moving said vacuum head includes an elongated rigid handle on the rearward end of said vacuum head housing.

9. The apparatus of claim 6 wherein a projection is formed on the forward end of each of the flanges of said vacuum head, said projections being formed with a slight inward taper in order to provide positive alignment of said vacuum head with said tracks of said filter.

* * * * *